United States Patent

Syed

(10) Patent No.: US 10,718,461 B2
(45) Date of Patent: Jul. 21, 2020

(54) INFLATABLE CARRIER PLUG SYSTEM AND METHOD

(71) Applicant: Cherne Industries Incorporated, Minneapolis, MN (US)

(72) Inventor: Asim Syed, Chanhassen, MN (US)

(73) Assignee: Cherne Industries Incorporated, Minneapolis, MN (US)

( * ) Notice: Subject to any disclaimer, the term of this patent is extended or adjusted under 35 U.S.C. 154(b) by 34 days.

(21) Appl. No.: 15/895,238

(22) Filed: Feb. 13, 2018

(65) Prior Publication Data
US 2018/0238484 A1    Aug. 23, 2018

Related U.S. Application Data

(60) Provisional application No. 62/461,556, filed on Feb. 21, 2017.

(51) Int. Cl.
*F16L 55/165* (2006.01)
*F16L 55/18* (2006.01)

(52) U.S. Cl.
CPC ....... *F16L 55/1654* (2013.01); *F16L 55/1656* (2013.01); *F16L 55/18* (2013.01)

(58) Field of Classification Search
CPC .... F16L 55/1654; F16L 55/1656; F16L 55/18
USPC ........................................................ 138/93
See application file for complete search history.

(56) References Cited

U.S. PATENT DOCUMENTS

| 4,025,360 | A | * | 5/1977 | Horne | E03F 9/00 134/167 C |
| 4,460,019 | A | * | 7/1984 | Condon | E03F 7/00 138/90 |
| 4,475,255 | A | * | 10/1984 | Tash | E03C 1/306 134/167 C |
| 4,887,931 | A | * | 12/1989 | Frisby | F16L 1/12 405/171 |
| 5,771,937 | A | * | 6/1998 | Collins | F16K 7/10 138/89 |
| 5,901,752 | A | * | 5/1999 | Lundman | F16L 55/134 138/89 |
| 5,934,311 | A | * | 8/1999 | Brown | F16L 55/124 137/240 |
| 6,516,832 | B1 | * | 2/2003 | Myers | E03L 37/003 138/93 |

(Continued)

*Primary Examiner* — Craig M Schneider
*Assistant Examiner* — David R Deal
(74) *Attorney, Agent, or Firm* — BakerHostetler

(57) ABSTRACT

An inflatable plug for sealing a pipeline includes a tubular member, a first indicator, and a second indicator. The tubular member has an inner surface and an outer surface that extends in an axial direction from a first end to a second end. The tubular member defines a central chamber configured to inflate to a predetermined pressure so that the outer surface of the tubular member expands to contact an inner surface of the pipeline. The contact between the outer surface of the tubular member and the inner surface of the pipeline define a contact length that extends in the axial direction. The first indicator and the second indicator are positioned on the outer surface of the tubular member. The first indicator is spaced from the second indicator in the axial direction by a predetermined length. The predetermined length is substantially equal to the contact length.

17 Claims, 6 Drawing Sheets

(56) References Cited

U.S. PATENT DOCUMENTS

| | | | | |
|---|---|---|---|---|
| 8,631,798 B2* | 1/2014 | Varga | ............... | A61M 16/20 128/207.16 |
| 2008/0163951 A1* | 7/2008 | Lundman | ............ | F16L 55/1286 138/93 |
| 2010/0089477 A1* | 4/2010 | Grobelny | ............. | F16L 55/134 138/93 |
| 2012/0273073 A1* | 11/2012 | Kutach | ................ | F16L 55/134 137/596 |
| 2013/0048130 A1* | 2/2013 | Lundman | ............. | F16L 55/124 138/93 |

* cited by examiner

INFLATABLE CARRIER PLUG SYSTEM AND METHOD

CROSS-REFERENCE TO RELATED APPLICATIONS

This application claims the benefit of U.S. Provisional Application No. 62/461,556, filed Feb. 21, 2017, the disclosure of which is incorporated by reference herein in its entirety.

TECHNICAL FIELD

This disclosure relates generally to a pipeline rehabilitation system and, more particularly, to a system and method for inflatable carrier plugs.

BACKGROUND

Pipelines are generally known to transport fluids (liquids or gases) over a physical distance within the internal channels of the constituent individual pipe sections. The pipe sections often run underground and are not easily accessible. Over time, the pipe sections can wear, corrode, or become damaged from drilling or other operations that often result in cracks or holes within the walls of the pipe sections that need repair or rehabilitation. Removing and replacing a corroded pipe section can be costly and time consuming. Therefore, corroded pipe sections are often repaired instead of replaced.

Current systems for repairing corroded pipe sections include the use of inflatable carrier plugs. The inflatable carrier plug is coated with a sealant, inserted into the corroded pipe section, and inflated. The sealant contacts and adheres to the corroded portion of the pipe section. The section of pipe needing repair often extends to a specific length, and end-users have to determine what size carrier plug to use and how much sealant to apply to the outer surface of the carrier plug to repair the pipe. This determination is generally made by approximating a length of contact between the inflated carrier plug and the inner wall of the corroded section of the pipe. Current methods of approximating the length of contact are imprecise, resulting in longer repair times and the use of excessive sealant.

Therefore, there is a need for an improved system and method for accurately determining a length of contact between an inflatable carrier plug and a corroded pipe section to at least reduce repair time and reduce the amount of sealant required.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein.

SUMMARY

The foregoing needs are met, to a great extent, by the inflatable carrier plug disclosed in the present application. The inflatable carrier plug includes at least one indicator positioned on an outer surface that indicates a contact length between the inflatable carrier plug and an inner surface of a pipeline.

An aspect of the present disclosure provides an inflatable plug carrier for repairing and sealing a pipeline that includes a tubular member, a first indicator, and a second indicator. The tubular member has an inner surface and an outer surface that extends in an axial direction from a first end to a second end. The tubular member defines a central chamber that is configured to inflate to a predetermined pressure so that the outer surface of the tubular member expands to contact an inner surface of the pipeline. The contact between the outer surface of the tubular member and the inner surface of the pipeline defines a contact length that extends in the axial direction. The first indicator and the second indicator are positioned on the outer surface of the tubular member. The first indicator is spaced from the second indicator in the axial direction by a predetermined length. The predetermined length is substantially equal to the contact length.

An alternative aspect of the inflatable carrier plug includes a tubular member, a first plate, a second plate, a first indicator, and a second indicator. The tubular member has an inner surface and an outer surface that extend in an axial direction from a first end to a second end. The first plate and the second plate are secured to the first end and the second end of the tubular member respectively. The first plate, the second plate, and the inner surface of the tubular member define a central chamber of the inflatable plug. The central chamber is configured to inflate to a predetermined pressure so that the outer surface of the tubular member expands to contact an inner surface of the pipeline. The contact between the outer surface of the tubular member and the inner surface of the pipeline defines a contact length that extends in the axial direction. The first indicator and the second indicator are positioned on the outer surface of the tubular member. The first indicator is spaced from the second indicator in the axial direction by a predetermined length. The predetermined length is substantially equal to the contact length.

Another aspect of the present disclosure provides a method for sealing a pipeline with an inflatable plug. The method comprises: coating a tubular member with a sealant material, the tubular member having an inner surface and an outer surface extending in an axial direction from a first end to a second end, the inner surface at least partially defining a central chamber, the outer surface including a first indicator and a second indicator positioned thereon, the first indicator spaced from the second indicator in the axial direction by a predetermined length; inserting the plug into the pipeline; and inflating the central chamber of the tubular member to a predetermined pressure so that the outer surface of the tubular member expands to contact an inner surface of the pipeline, the contact between the outer surface of the tubular member and the inner surface of the pipeline defining a contact length that extends in the axial direction, wherein the predetermined length is substantially equal to the contact length.

This summary is provided to introduce a selection of concepts in a simplified form that are further described below in the Detailed Description section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there are shown in the drawings illustrative embodiments of the disclosure. It should be understood, however, that the application is not limited to the precise arrangements and instrumentalities shown. In the drawings.

DETAILED DESCRIPTION

Figure 1:
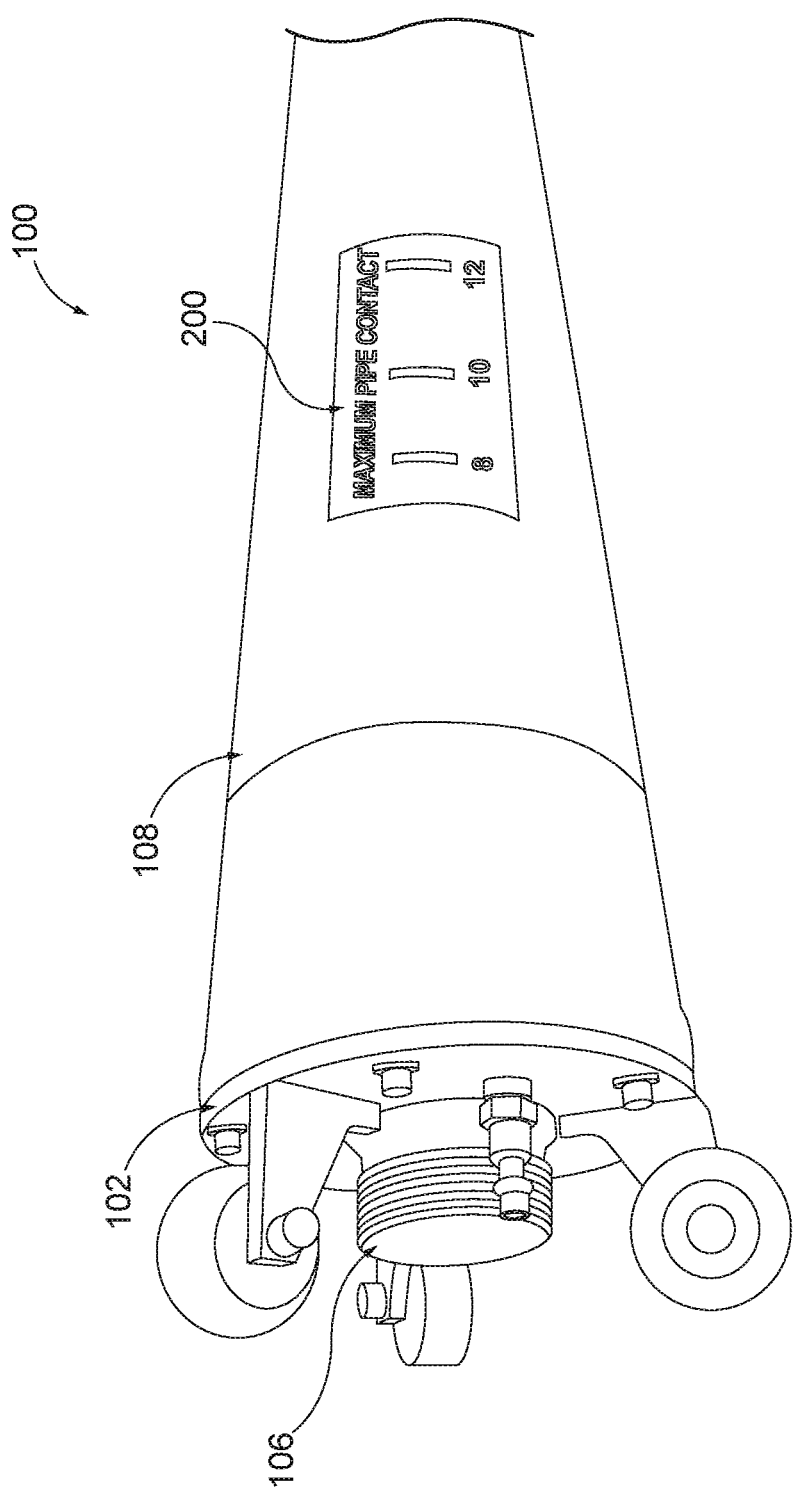
FIG. 1 is a perspective view of an inflatable carrier plug, according to an aspect of this disclosure.

An inflatable carrier plug used for sealing and repairing pipelines is disclosed. The inflatable plug is configured to fit within a pipeline and inflate to a predetermined pressure. When the inflatable plug reaches the predetermined pressure, an outer surface of the inflatable plug contacts an inner surface of the pipeline. The outer surface of the inflatable plug may be coated with a sealant material so that when the outer surface contacts the inner surface of the pipeline, the sealant material contacts and adheres to the pipeline, thereby sealing any cracks, holes, or other flaws in the pipeline needing repair. The outer surface of the inflatable plug includes a first indicator and a second indicator spaced apart from one another along an axial direction of the inflatable plug. The indicators are spaced apart by a predetermined contact length that represents a length of the outer surface of the inflatable plug that contacts the inner surface of the pipeline when the inflatable plug is pressurized up to the predetermined pressure.

Certain terminology used in this description is for convenience only and is not limiting. The words "axial" and "radial" designate directions in the drawings to which reference is made. The term "substantially" is intended to mean considerable in extent or largely but not necessarily wholly that which is specified. All ranges disclosed herein are inclusive of the recited endpoint and independently combinable (for example, the range of "from 2 grams to 10 grams" is inclusive of the endpoints, 2 grams and 10 grams, and all the intermediate values). The terminology includes the above-listed words, derivatives thereof and words of similar import.

Figure 2:
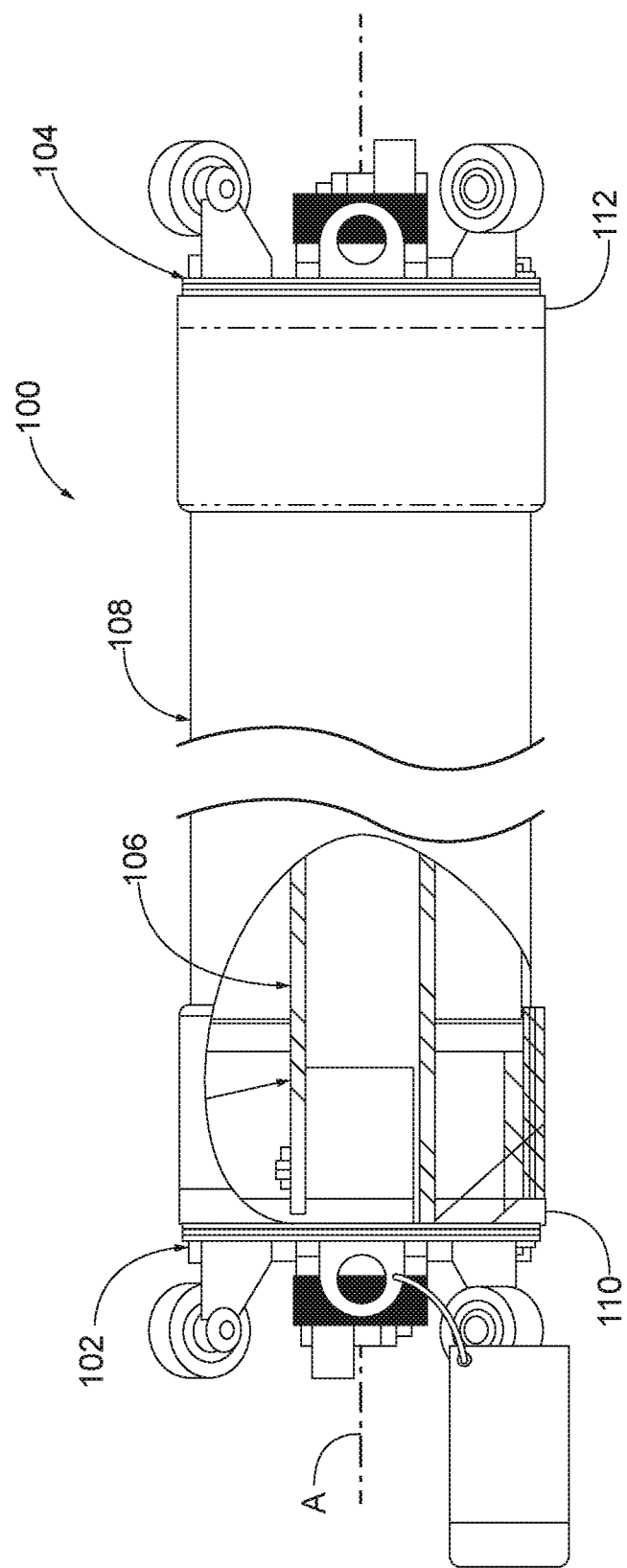
FIG. 2 is a partial cross sectional side view of the inflatable carrier plug shown in FIG. 1, according to an aspect of this disclosure.

FIGS. 1 and 2 illustrate an inflatable carrier plug 100 for sealing and repairing a pipeline, according to an aspect of this disclosure. The plug 100 is sized and configured to be inserted into a pipeline to a location that needs repair. The plug 100 is inflatable to form a tight seal between the plug 100 and with an internal surface area of the pipeline. More particularly, and as will be discussed in greater detail below, the plug 100 is adapted to wholly or partially contact the internal surface area that extends circumferentially about the interior of the pipeline.

The plug 100 includes a first end plate assembly 102, a second end plate assembly 104, a flow-through conduit 106, a tubular member 108, and at least one indicator 200. The plug 100 has a generally cylindrical shape that is elongate along an axis A, which extends centrally through the plug 100, from a first end 110 to a second end 112. The tubular member 108 and the flow-through conduit 106 are coupled to the first end plate assembly 102 at the first end 110 and coupled to the second end plate assembly 104 at the second end 112.

The plug 100 defines an outer diameter that may be increased upon inflation of the plug 100 to substantially match an inner diameter of a pipeline. The plug 100 is configured to be inflated so as to define a multi-range plug. For example, the plug 100 may be inflated such that the outer diameter of the plug 100 may be increased by 4-6 inches to conform to a range of internal diameters of an inner surface of the pipeline. It will be appreciated that other inflation ranges may be contemplated. Inflating the plug 100 to increase the outer diameter enables the plug 100 to conform to surface irregularities of the inner surface of the pipeline in order to cause uniform sealing and repair.

A single plug size of the plug 100 may accommodate many differently sized pipelines. For example, the plug 100 illustrated in FIG. 1 may accommodate pipelines with inner diameters that range from 8 to 12 inches. In alternative aspects, the plug 100 may be sized to accommodate different sized pipelines by increasing or decreasing the outer diameter of the plug 100. By way of non-limiting example, the plug 100 may be sized to accommodate pipelines that have inner diameters that range from, for example, 4 to 6 inches, 6 to 10 inches, 12 to 18 inches, 18 to 24 inches, and 24 to 36 inches.

The flow-through conduit 106 provides an internal passageway through the plug 100. The conduit 106 functions as a bypass to allow a controlled amount of fluid to pass through the plug 100 as needed during a test, repair, or construction operation while utilizing the plug 100. The conduit 106 may be structurally reinforced with a spring member (not shown) so that when the plug 100 is inflated, the conduit 106 will not collapse or otherwise be affected by high pressures within the plug 100.

Figure 3:
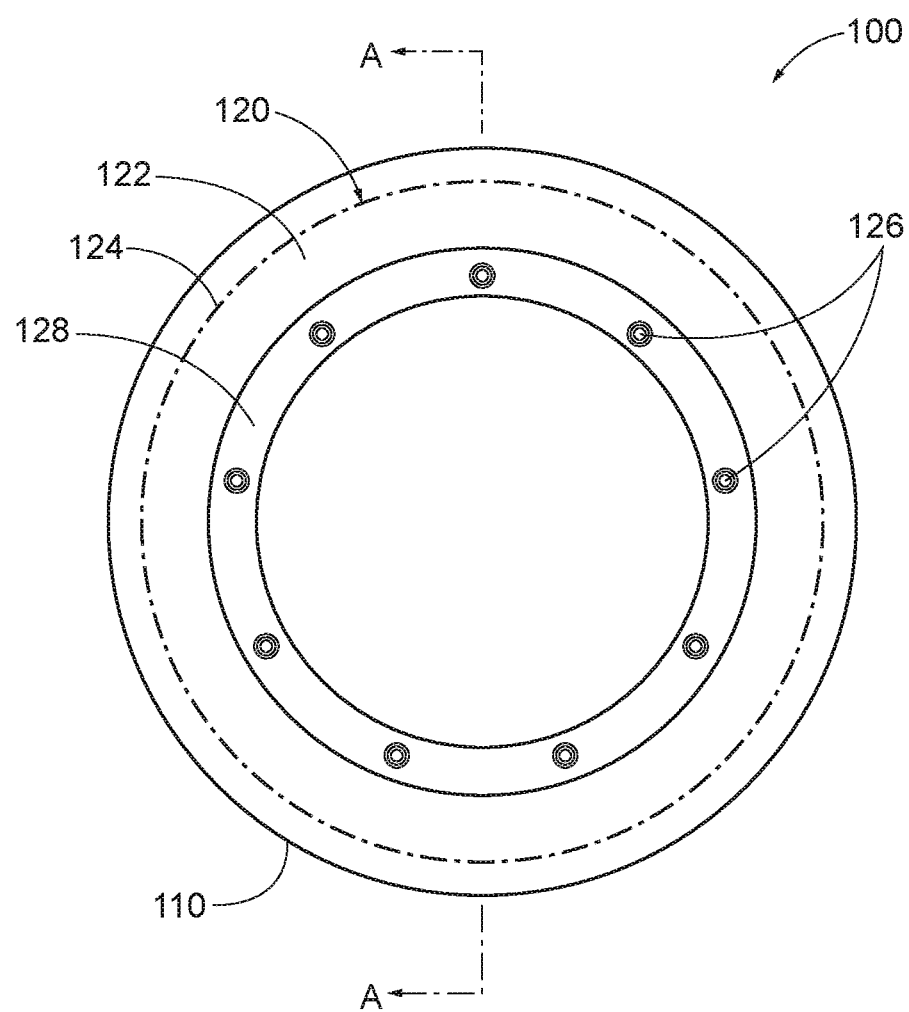
FIG. 3 is a top view of the inflatable carrier plug shown in FIG. 1, according to an aspect of this disclosure.
Figure 4:
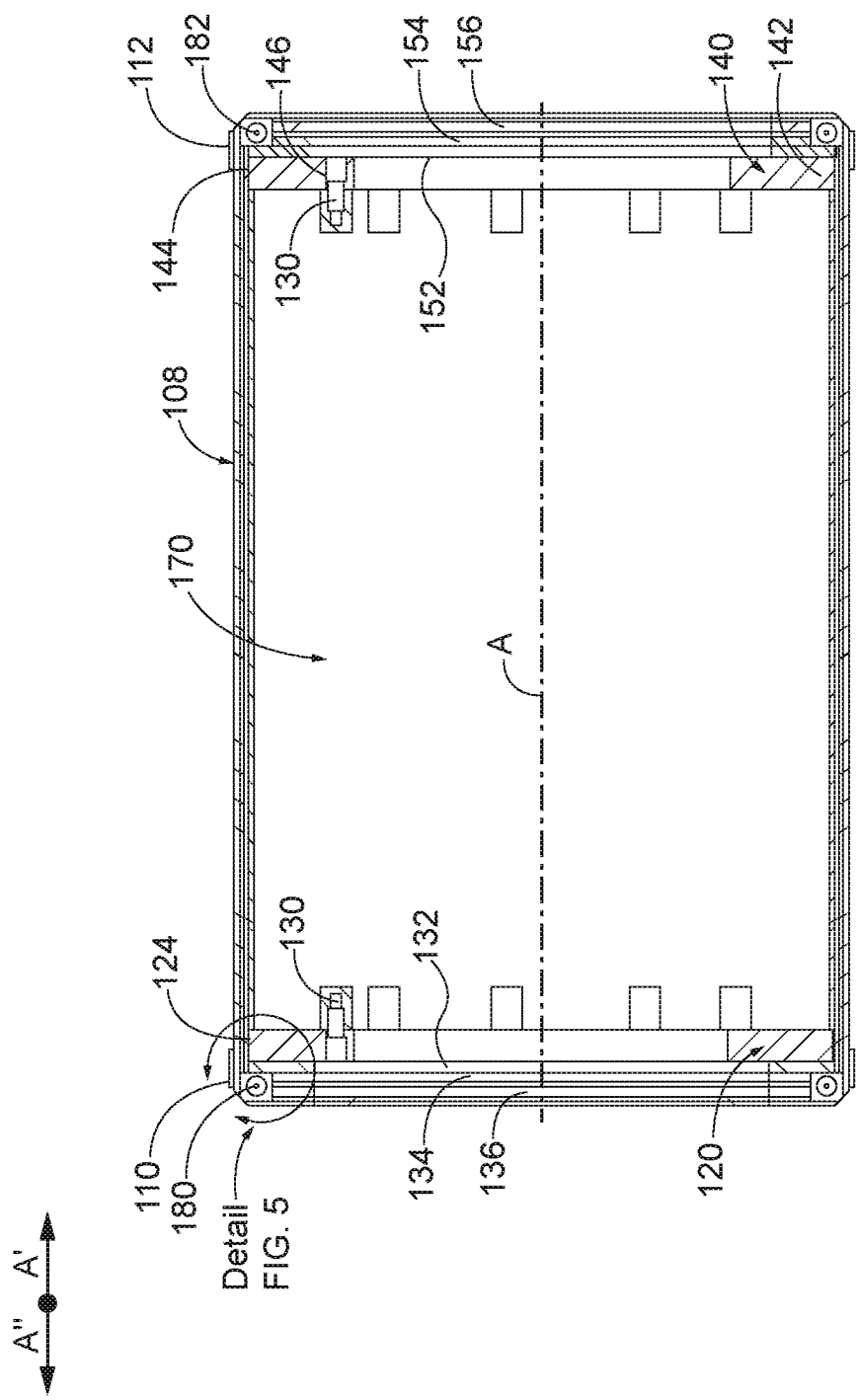
FIG. 4 is a side cross sectional view of the inflatable carrier plug taken along lines A-A in FIG. 3.

FIG. 3 illustrates a top view of the inflatable plug 100, and FIG. 4 illustrates a cross sectional view of the inflatable plug taken along line A-A of FIG. 3, according to aspects of this disclosure. The first end 110 of the plug 100 defines a first plate 120. The first plate 120 may comprise metal, for example, steel, or any other suitable metal having desirable strength characteristics known in the art of inflatable plugs. The first plate 120 may define a first circular body 122 having an outer diameter defined by a first outer edge 124. The first plate 120 may include a plurality of apertures 126 disposed around a periphery of an outer-facing surface 128 of the first plate 120. The apertures 126 are configured to receive a plurality of complementary bolts 130 so as to positionally fix the first end plate assembly 102 to the plug 100, and to seal the first end 110 of the plug 100. Although six apertures 126 are shown, it will be appreciated that any number of apertures may be included on the first plate 120. It will also be appreciated that the first plate 120 may include no apertures, and may instead include other sealing mechanisms, such as, but not limited to, glues, sealants, clips, fasteners, or other suitable sealing mechanisms known in the art.

The first end 110 of the plug 100 may include a series of elastomeric pads 132, 134, and 136 to facilitate the seal of the plug 100 with the first plate 120. The elastomeric pads 132, 134, and 136 may comprise rubber, or any other elastomeric material known in the art that allows for inflation of the plug 100.

The second end 112 of the plug 100 defines a second plate 140 that has a similar configuration to the first plate 120. The second plate 140 may be made of steel, or any other suitable metal known in the art. The second plate 140 may define a second circular body 142 having an outer diameter defined by a second outer edge 144. The second plate 140 may also include a plurality of apertures 146 that are configured to receive a plurality of complementary bolts 130 so as to positionally fix the second end plate assembly 104 to the plug 100, and to seal the second end 112 of the plug 100.

The second end 112 of the plug 100 may include a series of elastomeric pads 152, 154, and 156 to facilitate the seal of the plug 100 with the second plate 140. The elastomeric pads 152, 154, and 156 may comprise rubber, or any other elastomeric material known in the art that allows for inflation of the plug 100.

The plug 100 comprises first and second rings 180 and 182 disposed at the respective first and second ends 110 and 112. The first and second rings 180 and 182 may each have a generally toroidal-shaped body defining an exterior surface. The toroidal-shaped body may define a circular cross section that is swept about a circle having a center that is disposed on the axis A. In an alternative aspect, the first and second rings 180 and 182 may each have a generally collar-shaped body (e.g., a ring with flat walls when viewed in an axial direction). The collar-shaped body may define a rectangular cross section or rounded rectangular cross section that is swept about a circle having a center that is disposed on the axis A.

The first and second rings 180 and 182 have an inner portion that defines an inner diameter and an outer portion that defines an outer diameter. The outer diameter of the first and second rings 180 and 182 may be substantially equivalent to the outer diameter of the first and second plates 120 and 140, respectively. The first and second rings 180 and 182 may not be positionally fixed (e.g., floating) with respect to the first and second plates 120 and 140 and with respect to one another. Floating allows the first and second rings 180 and 182 to alter their positions or orientation as needed to distribute excessive or imbalanced internal or external pressures on the plug 100. The first and second rings 180 and 182 may comprise a metal, such as welded steel, or any other suitable metal having similar strength characteristics known in the art.

In an alternate aspect, the plug 100 may comprise multiple rings at each end 110 and 112. For example, multiple rings may be incorporated to each end 110 and 112 to increase the structural rigidity of the plug 100. Multiple rings may decrease the risk that the at least one layer 160, 162, and 164 of the tubular member 108 will separate from the first end plate assembly 102 and the second end plate assembly 104 under extreme pressure.

Figure 5:
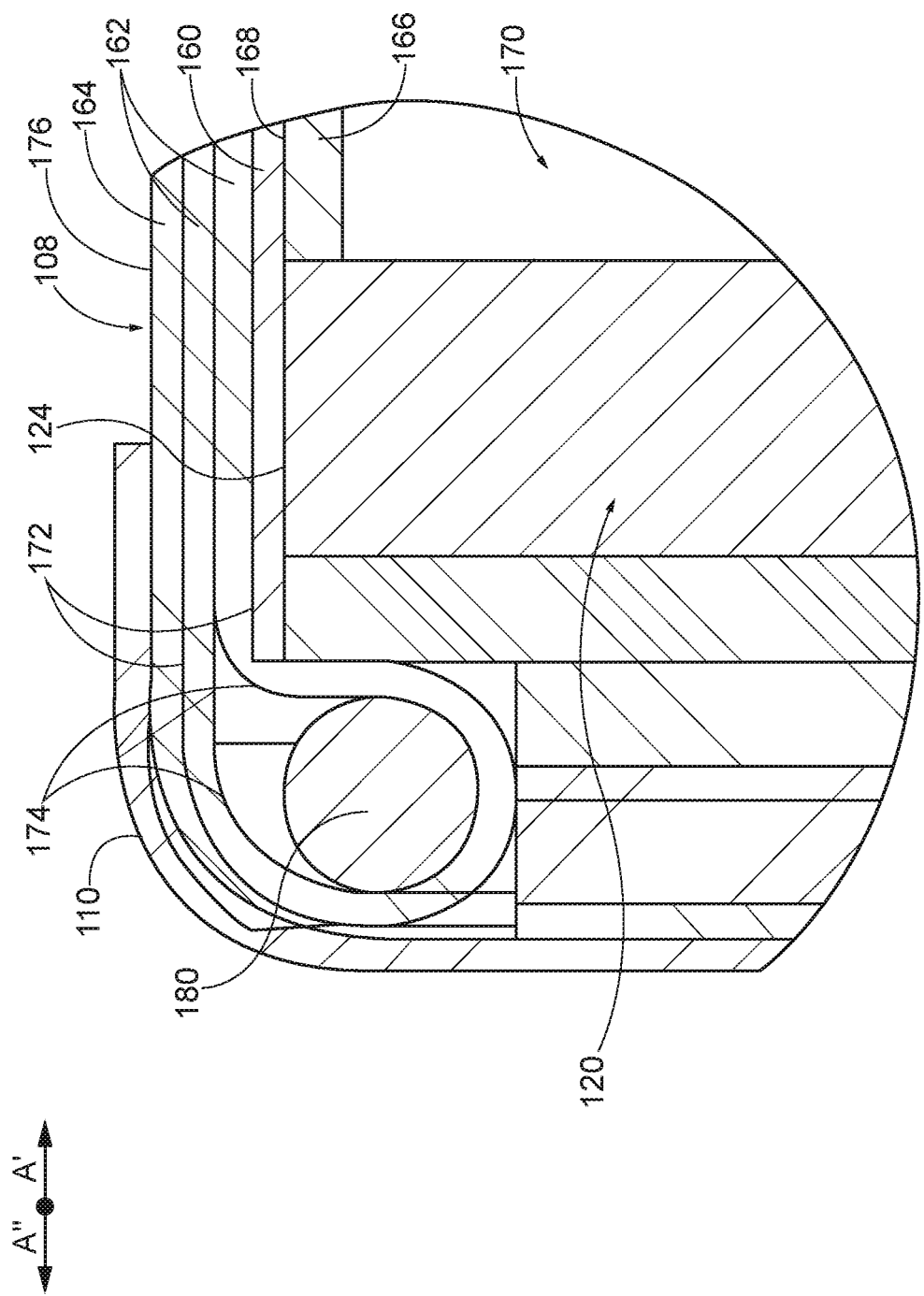
FIG. 5 is an enlarged detailed view of a cross section of a portion of the first end 110 of the plug 100 shown in FIG. 4.

FIG. 5 is an enlarged detailed view of a cross section of a portion of the first end 110 of the plug 100 shown in FIG. 4. The tubular member 108 extends substantially parallel to the axis A from the first end 110 to the second end 112. The tubular member 108 comprises an elastomeric material that includes at least one layer. The at least one layer may include an internal layer 160, a middle layer 162, and an external layer 164. The middle layer 162 is positioned on top of the internal layer 160 such that the middle layer 162 is positioned further radially outward from the axis A than the internal layer 160. Similarly, the external layer 164 is positioned on top of the middle layer 162 such that the external layer 164 is positioned further radially outward from the axis A than the middle layer 162. In an aspect, the elastomeric material comprises rubber.

The at least one layer 160, 162, and 164 is at least partially disposed on top of a tube 166 such that the at least one layer 160, 162, and 164 is positioned further radially outward from the axis A than the tube 166. The tube 166 may facilitate the manufacture of the inflatable plug 100, and may be removed once the plug 100 is vulcanized. The tube 166 has a cylindrical body that extends between the first plate 120 at the first end 110 to the second plate 140 at the second end 112. In an aspect, the tube 166 may comprise cardboard or other material used to facilitate the manufacture of a tube member.

The internal layer 160 is disposed on top of the tube 166 and may comprise a cylindrical body that extends from the first plate 120 to the second plate 140 along the first outer edge 124, an outer surface of the tube 166, and the second outer edge 144. The internal layer 160 having an inner surface 168 that extends substantially parallel to the axis A in an axial direction A'. The first plate 120, the second plate 140, and the inner surface 168 of the internal layer 160 define a central chamber 170.

An inflation port (not shown) may be selectively inserted into one of the first and second ends 110 and 112 of the plug 100 to provide a passageway into the central chamber 170. For example, the inflation port may be inserted through the first end plate assembly 102 or the second end plate assembly 104. The inflation port may be used to fill the central chamber 170 with an inflation medium to inflate the central chamber 170 to a predetermined pressure (e.g., inflation pressure) so that the external layer 164 of the tubular member 108 expands to contact an inner surface of the pipeline. The predetermined pressure may include, for example, an inflation pressure at which the central chamber 170 is substantially inflated or fully inflated. The inflation medium may comprise air, water, or another medium known in the art to cause inflation of plug 100. The predetermined pressure may depend on the size of the pipeline into which the plug 100 is being inserted to seal and repair, the size and/or structural integrity of tubular member 108, and/or still other parameters. The predetermined pressure may include a range of pressures between 15 and 45 pounds per square inch (psi). Smaller size plugs 100 may require higher inflation pressure (e.g., 45 psi), and larger size plugs 100 may require smaller inflation pressure (e.g., 15 psi). It will be appreciated, that in some applications, the predetermined pressure may exceed 45 psi.

The middle layer 162 is disposed on top of the inner layer 160 and may comprise a cylindrical body that extends from the first end 110 to the second end 112 of the plug 100. The middle layer 162 includes first and second opposed sides 172 and 174. The middle layer 162 may comprise rubber with a nylon fiber material built into the rubber. The nylon fiber may provide an additional measure of structural integrity to the middle layer 162 when the middle layer 162 is subjected to imbalanced internal or external pressures on the plug 100. The nylon fibers extend from the first end 110 to the second end 112 of the plug 100. In an aspect, the nylon fibers may extend along a direction that is parallel to the axial axis A. In alternative aspects, the middle layer 162 may comprise rubber with other fiber material built into the rubber, such as an aramid fiber or other suitable fiber capable of providing structural integrity to the middle layer 162.

The first side 172 of the middle layer 162 may abut an outer surface of the internal layer 160. The middle layer 162 may extend in a second axial direction A", substantially opposite to the axial direction A', beyond the first plate 120 and toward the first end 110 of the plug 100. The middle layer 162 extends inwardly towards the axis A and through the inner portion of the first ring 180, and wraps around the first ring 180 such that the second side 174 abuts the exterior surface of the first ring 180. The middle layer 162 extends beyond the outer portion of the first ring 180 and back along the axial direction A' such that the second side 174 of the middle layer 162 contacts and frictionally engages the second side 174 of the middle layer 162. In other words, the middle layer 162 extends along the internal layer 160, through the first ring 180, and back onto itself. It will be appreciated that the middle layer 162 extends about the second ring 182 in a substantially similar manner as it extends about the first ring 180.

The elastomeric pads 132, 134, and 136 positioned at the first end 110, and the elastomeric pads 152, 154, and 156, positioned at the second end 112, are fitted onto and bolted to the first and second plates 120 and 124 (as discussed above) to form a tight water-proof seal. The elastomeric pads 132, 134, 136, 152, 154, and 156 additionally function to "top off" the first and second ends 110 and 112 so as to make them flush with the middle layer 162 (as it wraps around the rings 180 and 182) and the external layer 164 disposed on the middle layer 162. The addition of the elastomeric pads 132, 134, 136, 152, 154, and 156 at each of the first and second ends 110 and 112 square the ends away with the rubber materials forming the tubular member 108 to result in a relatively smooth and even outer surface area of the plug 100.

Figure 6:
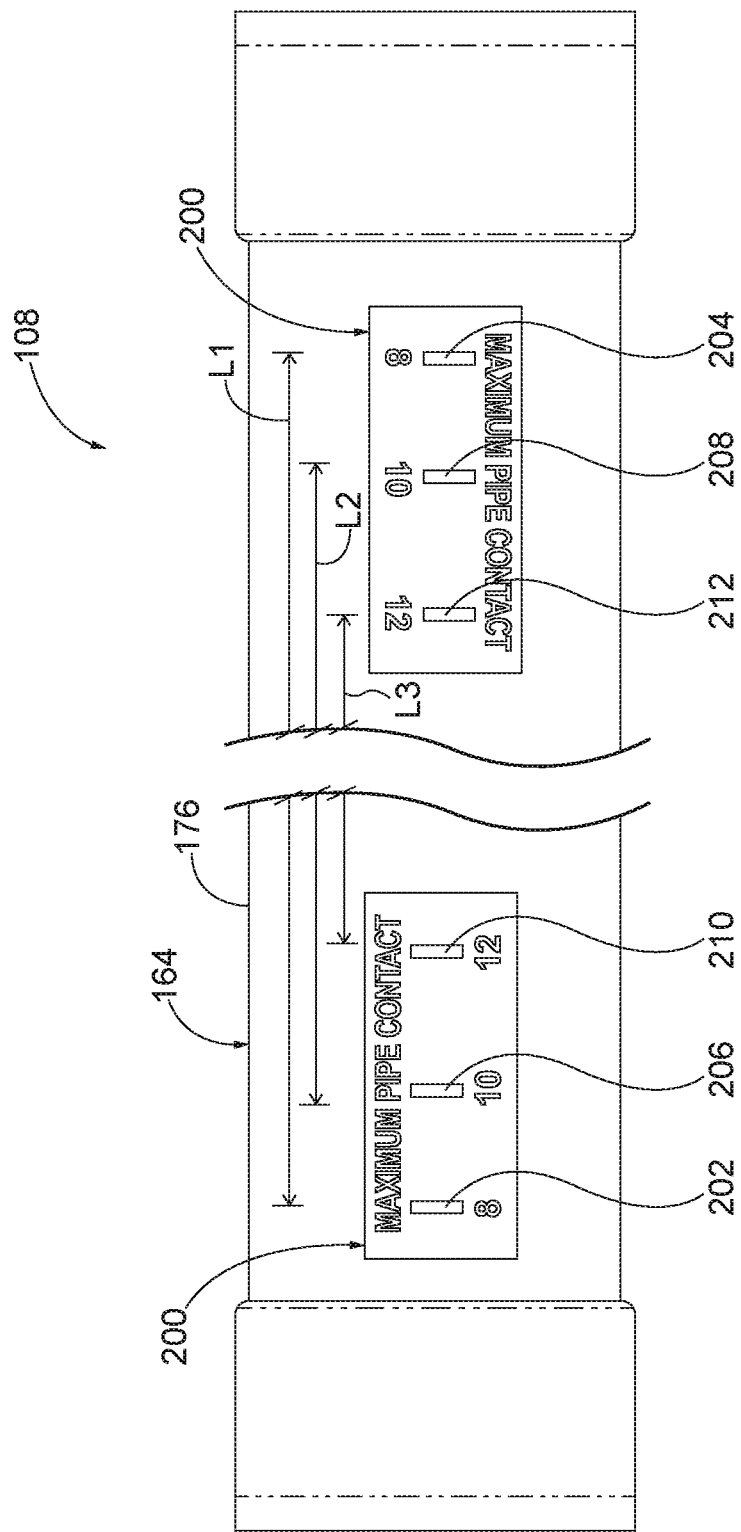
FIG. 6 is a side view of an inflatable carrier plug, according to an aspect of this disclosure.

FIG. 6 illustrates a side view of the tubular member 108, according to an aspect of this disclosure. The external layer 164 is disposed on top of the first side 172 of the middle layer 162 and may comprise a cylindrical body that extends from the first end 110 to the second end 112 of the plug 100. The external layer 164 includes an outer surface 176. The outer surface 176 includes the at least one indicator 200 positioned thereon. The at least one indicator 200 is spaced from both of the first and second ends 110 and 112 of the plug 100.

The at least one indicator 200 may comprise at least one pair of indicators. For example, the at least one indicator 200 may comprise a first pair of indicators that includes a first indicator 202 and a second indicator 204, a second pair of indicators that includes a third indicator 206 and a fourth indicator 208, and a third pair of indicators that includes a fifth indicator 210 and a sixth indicator 212. Each indicator within each pair of indicators is spaced apart from each other in the axial direction A' by a predetermined length. For example, the first indicator 202 is spaced apart from the second indicator 204 by a first predetermined length L1, the third indicator 206 is spaced apart from the fourth indicator 208 by a second predetermined length L2, and the fifth indicator 210 is spaced apart from the sixth indicator 212 by a third predetermined length L3. It will be appreciated that the at least one indicator 200 may include fewer or more pairs of indicators than illustrated.

The first, second, and third predetermined lengths L1, L2, and L3 may be determined based on the outer diameter of the plug 100 and the inner diameter of the pipeline through which the plug 100 is being inserted to seal and repair. For example, when the plug 100 is inserted into a pipeline and inflated to the predetermined pressure, the outer surface 176 of the tubular member 108 contacts the inner surface of the pipeline. The contact (or contacting portion) between the outer surface 176 and the inner surface of the pipeline may be referred to as a contact length, and extends in the axial direction A'. The contact length varies depending on a difference between the outer diameter of the plug 100 and the inner diameter of the pipeline. For example, if there is a large difference between the diameter of the plug 100 and the inner diameter of the pipeline, the contact length may be small when the plug 100 is inflated to the predetermined pressure. Conversely, if there is a small difference between the plug 100 diameter and the pipeline diameter, the contact length may be large when the plug 100 is inflated to the predetermined pressure.

The predetermined pressure corresponds to the predetermined lengths L1, L2, and L3 and each pair of indicators corresponds to a size of the inner diameter of the pipeline. Stated another way, the indicators 200 are located on the outer surface 176 of the plug 100 based on the predetermined pressure and the size of the pipeline. For example, the first and second indicators 202 and 204 may correspond to a pipeline having an inner diameter of 8 inches. When the plug 100 is positioned within a pipeline having an inner diameter of 8 inches and inflated to the predetermined pressure, the contact between the outer surface 176 of the plug 100 and the inner surface of the pipeline extends from the first indicator 202 to the second indicator 204, such that the contact length is substantially equal to the first predetermined length L1. Similarly, the third and fourth indicators 206 and 208 may correspond to a pipeline having an inner diameter of 10 inches. When the plug 100 is positioned within a pipeline having an inner diameter of 10 inches and inflated to the predetermined pressure, the contact between the outer surface 176 of the plug 100 and the inner surface of the pipeline extends from the third indicator 206 to the fourth indicator 208, such that the contact length is substantially equal to the second predetermined length L2. The same may be true for the fifth and sixth indicators 210 and 212. The fifth and sixth indicators 210 and 212 may correspond to a pipeline having an inner diameter of 12 inches. When the plug 100 is positioned within a pipeline having an inner diameter of 12 inches and inflated to the predetermined pressure, the contact between the outer surface 176 of the plug 100 and the inner surface of the pipeline extends from the fifth indicator 210 to the sixth indicator 212, such that the contact length is substantially equal to the third predetermined length L3. In each of the above examples, the plug 100 is configured to be inflated to the same predetermined pressure, causing the contact length to vary based on the size of the pipeline. One of ordinary skill in the art will readily appreciate that the at least one indicator 200 and its constituent indicators may correspond to pipelines having a wide range of inner diameters, and is not so limited to the numeric values described with respect to the illustrated embodiment in FIG. 6.

The inflatable plug 100 is beneficial during an operation to seal and repair the inner surface of the pipeline. When sealing and repairing the inner surface of the pipeline, the outer surface 176 of the plug 100 may be wrapped with a sheet (e.g., a plastic sheet) to prevent any sealant material, such as pipe repair resins and chemicals, from coming in contact with the plug 100. The sheet may be coated with the sealant material prior to being inserted into the pipeline. The amount of sealant material may depend upon the inner diameter of the pipeline being repaired. For example, if the pipeline has an 8 inch inner diameter, the outer surface 176 may be coated between the first indicator 202 and the second indicator 204. The plug 100 may then be inserted into the pipeline, and the central chamber 170 of the plug 100 may be inflated to the predetermined pressure so that the outer surface 176 contacts the inner surface of the pipeline. The contact length extends between the first indicator 202 and the second indicator 204, depositing the sealant material onto the inner surface of the pipeline by the first predetermined length L1. After the sealant material adheres to the pipeline, the central chamber 170 of the plug 100 may be deflated and the plug 100 may be withdrawn from the pipeline.

The at least one indicator 200 may be formed as part of the tubular member 108, or may be coupled onto the outer surface 176. The at least one indicator 200 may include bands that extend around the outer surface 176 (e.g., different color bands to indicate different predetermined lengths), rectangular labels, or other markers to indicate a predetermined length. In an aspect, each indicator within their respective pair is spaced from the respective first and second ends 110 and 112 by substantially the same distance. For example, the first indicator 202 may be spaced from the first end 110 by a first distance that extends parallel to the axis A, and the second indicator 204 may be spaced from the second end 112 by a second distance that extends parallel to the axis A, whereby the first distance is substantially equal to the second distance.

As described above, the plug 100 may be sized to accommodate pipelines that have a wide range of inner diameters. The position of the at least one indicator 200 may vary between plugs 100 having different sizes. The position of the at least one indicator 200 depends on the size of the outer diameter of the plug 100 and the diameter of the inner surface of the pipeline that will be repaired. Moreover, the predetermined lengths between each pair of indicators also may vary between plugs 100 having different sizes. The position of the at least one indicator 200 and the predetermined lengths between each pair of indicators may be based on a contour of the outer surface of the plug 100 when the plug 100 is inflated to the predetermined pressure.

A benefit of the plug 100 is that the contact length between the outer surface 176 of the plug 100 and the inner surface of the pipeline may be determined prior to coating the outer surface 176 with sealant material and inserting the plug 100 into the pipeline. This allows an end-user to more accurately predict the amount of sealant material to use when coating the outer surface 176 of the plug 100 and to more accurately align the plug 100 with the section of the pipeline that is corroded in order to effectuate a repair. Further benefits of the disclosed inflatable plug 100 include: simplifying the manufacturing process and making the manufacturing process repeatable; minimizing the need for skilled labor to manufacture the plug 100; making the plug 100 design easily scalable to adapt to different pipeline sizes; and providing a clear way to indicate contact length in a given pipe size which is beneficial in the pipe rehabilitation industry.

It will be appreciated that the foregoing description provides examples of the disclosed system and method. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

What is claimed is:

1. An inflatable plug for sealing a pipeline, the inflatable plug comprising:
    a tubular member having an inner surface and an outer surface extending in an axial direction from a first end to a second end;
    a first plate and a second plate removably secured to the first end and the second end of the tubular member respectively, such that the first plate, the second plate, and the inner surface of the tubular member together define a central chamber of the inflatable plug, the central chamber being configured to inflate to a predetermined pressure so that the outer surface of the tubular member expands radially outwardly such that a contacting portion of the outer surface will contact an inner surface of the pipeline, the contacting portion having a contact length that extends in the axial direction; and
    a first indicator and a second indicator positioned on the outer surface of the tubular member, the first indicator spaced from the second indicator in the axial direction by a predetermined length, wherein the predetermined length is substantially equal to the contact length, and wherein the first indicator and the second indicator are substantially flush with the outer surface of the tubular member such that a diameter of the outer surface of the tubular member is substantially the same along a length of the tubular member from the first end to the second end when the inflatable plug is in a deflated configuration.

2. The inflatable plug of claim 1, wherein each one of the first and second plates define a circular body having an outer diameter further defined by first and second outer edges respectively, and wherein the first and second plates are aligned along the axial direction.

3. The inflatable plug of claim 2, further comprising:
    a first ring and a second ring respectively disposed at the first end and the second end of the tubular member, the first and second rings each having an inner portion defining an inner diameter and an outer portion defining an outer diameter, wherein the outer diameter of each of the first and second rings is substantially equal to the outer diameter of each of the first and second plates respectively, and wherein the first ring is disposed adjacent to the first plate and the second ring is disposed adjacent to the second plate.

4. The inflatable plug of claim 3, wherein the tubular member comprises a sheet having a first part and a second part, wherein the first part extends axially from a centrally disposed portion beyond the first and second outer edges of the each of the first and second plates and through the inner portions of the first and second rings, and wherein the second part of the sheet extends around respective exterior surfaces of the first and second rings and past the respective outer portions of the first and second rings back toward the centrally disposed portion, such that the first part of the sheet frictionally engages the second part of the sheet.

5. The inflatable plug of claim 4, wherein the sheet comprises rubber.

6. The inflatable plug of claim 4, further comprising:
    a series of rubber pads connectable and securable to the first and second plates at the respective first and second ends of the tubular member, the series of rubber pads sealingly engaging the sheet at the inner portions of the first and second rings so as to partially define the central chamber of the inflatable plug.

7. The inflatable plug of claim 1, wherein the first indicator is spaced from the first end by a first distance, and the second indicator is spaced from the second end by a second distance, and wherein the first distance and the second distance are substantially equal.

8. The inflatable plug of claim 1, wherein the predetermined length is dependent upon a diameter of the pipeline.

9. The inflatable plug of claim 1, wherein the predetermined length is a first predetermined length, wherein the contact length is a first contact length, wherein the pipeline is a first pipeline, and wherein the central chamber is further configured to inflate to the predetermined pressure so that the outer surface of the tubular member expands radially outwardly such that a second contacting portion of the outer surface will contact an inner surface of a second pipeline, the second contacting portion having a second contact length that extends in the axial direction, the inflatable plug further comprising:
a third indicator and a fourth indicator positioned on the outer surface of the tubular member, the third indicator spaced from the second indicator in the axial direction by a second predetermined length, wherein the second contact length and the second predetermined length are substantially equal.

10. The inflatable plug of claim 9, wherein a diameter of the first pipeline is different from a diameter of the second pipeline, and wherein the first predetermined length is different from the second predetermined length.

11. The inflatable plug of claim 1, further comprising:
a flow-through conduit extending through the plug from the first end to the second end.

12. The inflatable plug of claim 1, wherein the first and second plates comprise a first material, and wherein the tubular member comprises a second material, wherein the first material is different from the second material.

13. An inflatable plug for sealing a pipeline, the inflatable plug comprising:
a tubular member having an inner surface and an outer surface extending in an axial direction from a first end to a second end, the inner surface defining a central chamber configured to inflate to a predetermined pressure so that the outer surface of the tubular member expands to contact an inner surface of the pipeline, the contact between the outer surface of the tubular member and the inner surface of the pipeline defining a contact length that extends in the axial direction; and
a first indicator and a second indicator positioned on the outer surface of the tubular member, the first indicator spaced from the second indicator in the axial direction by a predetermined length, wherein the predetermined length is dependent upon an outer diameter of the tubular member, and wherein the predetermined length is substantially equal to the contact length, and wherein the first indicator and the second indicator are substantially flush with the outer surface of the tubular member such that a diameter of the outer surface of the tubular member is substantially the same along a length of the tubular member from the first end to the second end when the inflatable plug is in a deflated configuration.

14. The inflatable plug of claim 13, wherein the predetermined length is dependent upon a diameter of the pipeline.

15. The inflatable plug of claim 13, wherein the outer surface further includes third and fourth indicators spaced from one another in the axial direction by a second predetermined length that is different than the first predetermined length, wherein the second predetermined length corresponds to a second contact length that is different than the first contact length.

16. The inflatable plug of claim 13, further comprising:
a first plate and a second plate removably securable to the first end and the second end of the tubular member, respectively, wherein the first and second plates at least partially define the central chamber when the first and second plates are secured to the tubular member.

17. An inflatable plug for sealing a pipeline, the inflatable plug comprising:
a tubular member having an inner surface and an outer surface extending in an axial direction from a first end to a second end;
a first plate and a second plate removably secured to the first end and the second end of the tubular member respectively, such that the first plate, the second plate, and the inner surface of the tubular member together define a central chamber of the inflatable plug, the central chamber being configured to inflate to a predetermined pressure so that the outer surface of the tubular member expands radially outwardly such that a contacting portion of the outer surface will contact an inner surface of the pipeline, the contacting portion having a contact length that extends in the axial direction, wherein each one of the first and second plates define a circular body having an outer diameter further defined by first and second outer edges respectively;
a first indicator and a second indicator positioned on the outer surface of the tubular member, the first indicator spaced from the second indicator in the axial direction by a predetermined length, wherein the predetermined length is substantially equal to the contact length;
a first ring and a second ring respectively disposed at the first end and the second end of the tubular member, the first and second rings each having an inner portion defining an inner diameter and an outer portion defining an outer diameter, wherein the outer diameter of each of the first and second rings is substantially equal to the outer diameter of each of the first and second plates respectively, and wherein the first ring is disposed adjacent to the first plate and the second ring is disposed adjacent to the second plate,
wherein the tubular member comprises a sheet having a first part and a second part, wherein the first part extends axially from a centrally disposed portion beyond the first and second outer edges of the each of the first and second plates and through the inner portions of the first and second rings, and wherein the second part of the sheet extends around respective exterior surfaces of the first and second rings and past the respective outer portions of the first and second rings back toward the centrally disposed portion, such that the first part of the sheet frictionally engages the second part of the sheet; and
a series of rubber pads connectable and securable to the first and second plates at the respective first and second ends of the tubular member, the series of rubber pads sealingly engaging the sheet at the inner portions of the first and second rings so as to partially define the central chamber of the inflatable plug.

* * * * *